`United States Patent Office`

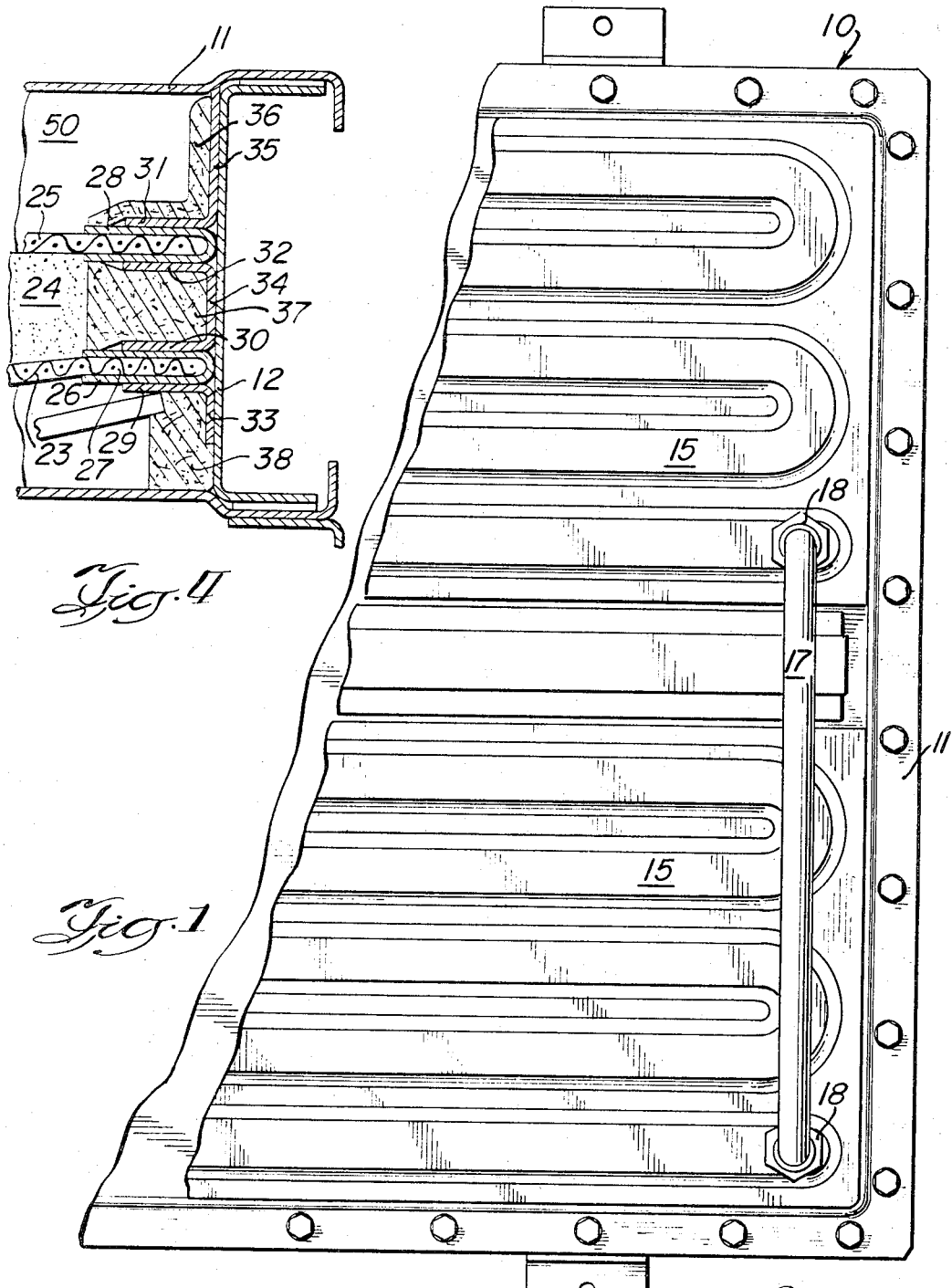

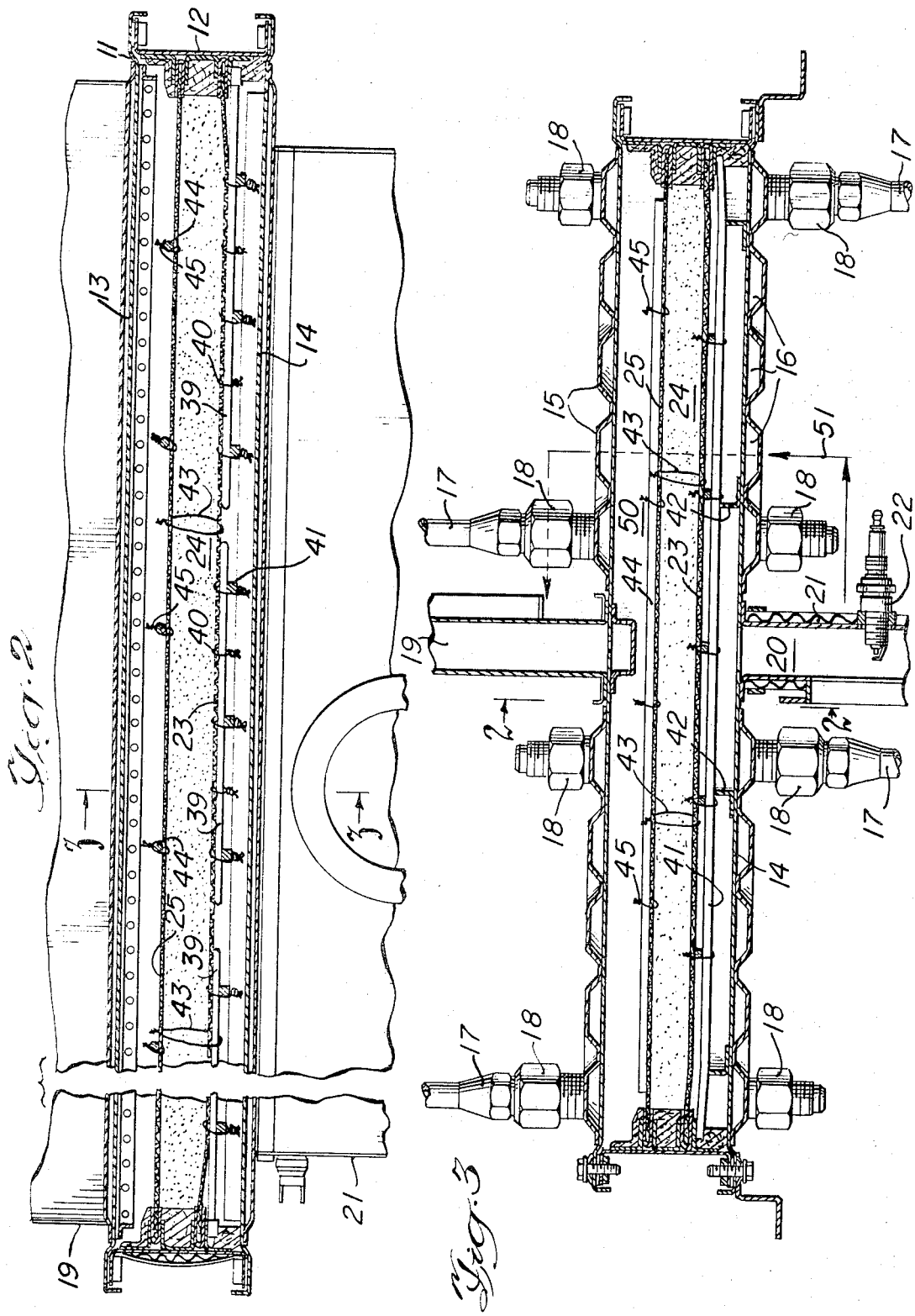

3,421,860
Patented Jan. 14, 1969

3,421,860
REACTOR FOR GENERATING A CARBON DIOXIDE RICH ATMOSPHERE
Michael J. Bottas, St. Joseph, Mich., assignor to Whirlpool Corporation, a corporation of Delaware
Filed Jan. 14, 1965, Ser. No. 425,566
U.S. Cl. 23—281                                4 Claims
Int. Cl. B01j 7/00

ABSTRACT OF THE DISCLOSURE

A catalytic hydrocarbon fuel burner having confining screens above and below the catalyst bed whereby the catalyst is prevented from substantially moving by vibration or other movement of the burner.

---

This invention relates to improvements in a reactor for generating a carbon dioxide rich atmosphere that is useful for preserving animal and plant materials such as foods and particularly to improvements which allow use of the reactor in either stationary or movable installations, as desired.

In the prior patents of Bedrosian et al., Nos. 3,102,778 and 3,102,780, assigned to the same assignee as the present application, there are disclosed apparatus and methods for preserving animal and plant materials by the use of a controlled atmosphere containing greater amounts of carbon dioxide and lesser amounts of oxygen than those found in ordinary air. An essential feature of the disclosures of these patents is the carbon dioxide rich atmosphere generator.

A catalytic reactor for reacting the hydrocarbon fuel and oxygen in the presence of a catalyst to produce such an atmosphere is disclosed and claimed in the James W. Lannert copending application Ser. No. 321,607, filed Nov. 5, 1963 (now abandoned) and also assigned to the same assignee as the present application. The present invention is generally similar in construction to the one disclosed in the copending Lannert application but has means, in addition, for confining the catalyst bed to prevent irregularities in the bed thickness caused by bed movement. Further, the present invention has means for diluting the air-fuel mixture entering the reactor to prevent preignition (flashback) which could be caused by the confining means, since the confining means often reaches a sufficient temperature to cause preignition. A method of diluting the air-fuel mixture is disclosed in Roy W. Kruggel copending application Ser. No. 415,617, filed Dec. 3, 1964, and also assigned to the same assignee as the present application.

Therefore, one of the features of this invention is to provide an improved reactor for generating an atmosphere of the above type in which a bed of a granular catalyst is provided and is retained between two gas pervious supports in the reactor frame.

A further feature of this invention is to provide an air-fuel dilution means and a bed confining means for a catalytic reactor.

Other features and advantages of the invention will be apparent from the following description of one embodiment thereof taken in conjunction with the accompanying drawings. Of the drawings:

FIGURE 1 is a fragmentary plan view showing a portion only of a reactor embodying the invention.

FIGURE 2 is a vertical sectional view taken substantially along line 2—2 of FIGURE 3.

FIGURE 3 is a vertical sectional view taken substantially along line 3—3 of FIGURE 2.

FIGURE 4 is an enlarged fragmentary view of a portion of the right-hand side of FIGURE 3.

The reactor 10 of this invention comprises a frame 11 having sides 12, a top 13 and a bottom 14. As is shown and described in greater detail in the above Lannert application, the top and bottom are cooled by water passages 15 and 16 supplied with water through tubes 17 and couplings 18. As these form no part of the present invention they are not shown and described in detail.

Also forming a part of the reactor are an inlet manifold 19 and an exhaust manifold 20 which is insulated as indicated at 21 and provided with a spark plug 22 for initiating combustion.

The generator has other elements and controls that are described in more detail in the Lannert application but which are not shown and described here because they form no part of this invention.

Extending between the side walls which in a rectangular reactor would include both end and lateral walls is a first gas pervious support 23 in the form of a metal screen. This supports the weight of the granular catalyst bed 24. At the top of the bed 24 and substantially parallel to the first screen 23 is a second gas pervious support or metal screen 25. The catalyst catalyzes the low temperature reaction of oxygen with a carbonaceous fuel to form an atmosphere rich in carbon dioxide. The mixture of the oxygen such as air and the fuel is supplied to the reactor by way of the inlet manifold 19. Catalysts of this type and catalytic combustion to provide the carbon dioxide rich atmosphere are described in detail in the above Bedrosian Patent 3,102,778.

As is shown most clearly in FIGURE 4, the first screen 23 has its edges loosely received in U-shaped channel members 26 each having an open side facing away from its side wall 12 and loosely receiving an edge 27 of screen 23.

The upper or second screen 25 has its edge held in a similar channel 28. The two channels 26 and 28 are substantially parallel and are spaced apart a distance approximately equal to the thickness of the bed 24. The lower channel 26 is retained between inwardly extending parallel flanges 29 and 30. The upper channel 28 is similarly held between flanges 31 and 32. Bottom flange 29 is a part of a bracket 33 attached to the side wall 12. The flanges 30 and 32 are parts of a U-shaped bracket 34 also attached to the wall 12. The top flange 31 is a part of a bracket 35 attached to the wall 12 and similar to the lower bracket 33. The customary heat insulation 36, 37 and 38 is provided on the inner surfaces of the brackets and the side walls in order to protect them from damage by the heat of reaction and to retain the heat in the reactor.

In order to support the first or lower screen 23 and thus the catalyst bed 24 there are provided stiffener rod members 39 (FIGURES 2 and 3) attached to the screen 23 by wire ties 40 and support rod members 41 resting on the vertical flanges of spaced bottom brackets 42 mounted on the bottom 14 of the reactor. The bottom support including the rod members 39 and 41, brackets and wire ties is disclosed and claimed in the copending application of James W. Lannnert et al. Ser. No. 422,973, filed Jan. 4, 1965, assigned to the same assignee as the present application.

In order to aid in retaining the granular catalyst bed 24 against substantial shifting, the two screens 23 an 25 are tied together by wire ties 43 extending through the bed 24.

The stiffener rod members 39 are substantially parallel to each other while the support rod members 41 are substantially parallel to each other and transverse to the stiffener rod members. In addition, the second or upper screen 25 is provided with elongated stiffener rod members 44 extending from one side of the upper screen to the other and tied thereto by wire ties 45. The upper members 44 are substantially parallel to each other and are transverse to the lower stiffener rod members 39.

With the structure of this invention the catalyst bed is held firmly between two supports: the bottom screen and its support and stiffeners and the upper screen and its stiffeners. Thus, this generator is usable without substantial shifting of the bed on ships, railway cars, trucks and other movable carriers to generate the desired atmosphere.

In order to prevent preignition and preburning of the fuel in the space 50 into which the fuel-air mixture is directed from the inlet manifold 19 means are provided for diluting the incoming air-fuel mixture. In the embodiment shown, particularly FIGURE 3, this means includes the bypass line 51 which leads carbon dioxide rich atmosphere from the exhaust manifold 20 back into the inlet manifold 19. As a result the fluid mixture to the space 50 will not support ordinary burning in the space 50 with the result being only catalytic burning in the bed 24 is possible.

Such preignition and preburning is frequently caused by the screen 25 which is of metal being heated by the catalytic reaction in the bed 24 to a temperature high enough to cause ignition in this space 50.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A reactor for generating an atmosphere rich in carbon dioxide by the catalytic combustion of fuel, comprising: an enclosing frame having side and end walls; a first gas pervious support in said frame for supporting the weight of a granular catalyst bed; a channel member on each of said side and end walls each having an open side facing away from its wall and loosely receiving an edge of said first support for loose retention in its said channel; spaced stiffener rod members beneath said first support; means for attaching said stiffener rod members to said first support; spaced support rod members beneath and bearing said stiffener rod members and thus said first support; means in said frame for supporting said first support rod members and thus said stiffener rod members and gas pervious support; a second gas pervious support in said frame above said first support, said first and second supports being adapted to receive said catalyst bed therebetween; and a channel member on each of said side and end walls each having an open side facing away from its wall and loosely receiving an edge of said second support for loose retention in its said channel.

2. The reactor of claim 1 wherein spaced stiffener rod members are provided attached to said second support.

3. The reactor of claim 2 wherein the stiffener rod members of said first support are substantially parallel to each other, and the stiffener rod members of said second support are substantially parallel to each other and transverse to the first support stiffener rod members.

4. A reactor for generating an atmosphere rich in carbon dioxide by the catalytic combustion of fuel, comprising: an enclosing frame having side and end walls; a first gas pervious support in said frame for supporting the weight of a granular catalyst bed; a channel member on each of said side and end walls each having an open side facing away from its wall and loosely receiving an edge of said first support for loose retention in its said channel; spaced stiffener rod members beneath said first support; means for attaching said stiffener rod members to said first support; spaced support rod members beneath and bearing said stiffener rod members and thus said first support; means in said frame for supporting said first support rod members and thus said stiffener rod members and gas pervious support; a second gas pervious support in said frame above said first support, said first and second supports being adapted to receive said catalyst bed therebetween; a channel member on each of said side and end walls each having an open side facing away from its wall and loosely receiving an edge of said second support for loose retention in its said channel, said first support channel members being arranged substantially in a single first plane and said second support channel members being arranged substantially in a single second plane in which the two planes are substantially parallel; and spaced means interconnecting said supports and extending through the catalyst bed.

References Cited

UNITED STATES PATENTS

| | | | |
|---|---|---|---|
| 3,203,770 | 8/1965 | Ranum | 23—281 |
| 3,024,593 | 3/1962 | Houdry. | |
| 2,897,158 | 7/1959 | Sanzenbacher et al. | 23—281 XR |
| 2,834,657 | 5/1958 | Houdry | 23—288 |

JAMES H. TAYMAN, Jr., *Primary Examiner.*

U.S. Cl. X.R.

23—288, 2; 431—329